United States Patent
Kawasaki et al.

(10) Patent No.: US 11,577,984 B2
(45) Date of Patent: Feb. 14, 2023

(54) METHOD FOR MANUFACTURING OPTICAL FIBER PREFORM, OPTICAL FIBER PREFORM, METHOD FOR MANUFACTURING OPTICAL FIBER, AND OPTICAL FIBER

(71) Applicant: FURUKAWA ELECTRIC CO., LTD., Tokyo (JP)

(72) Inventors: Mitsuhiro Kawasaki, Tokyo (JP); Tomohiro Gonda, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/923,490

(22) Filed: Jul. 8, 2020

(65) Prior Publication Data
US 2020/0339465 A1    Oct. 29, 2020

Related U.S. Application Data

(63) Continuation of application No. PCT/JP2019/001344, filed on Jan. 17, 2019.

(30) Foreign Application Priority Data

Jan. 19, 2018  (JP) .............................. JP2018-007172

(51) Int. Cl.
  *G02B 6/02*      (2006.01)
  *G02B 6/036*     (2006.01)
  (Continued)

(52) U.S. Cl.
  CPC ........ *C03B 37/0144* (2013.01); *C03C 25/104* (2013.01); *G02B 6/02395* (2013.01);
  (Continued)

(58) Field of Classification Search
  CPC .................................................. G02B 6/03627
  See application file for complete search history.

(56) References Cited

U.S. PATENT DOCUMENTS 5,838,867 A * 11/1998 Onishi ............... G02B 6/02004
                                                            385/123
6,263,706 B1  7/2001 Deliso et al.
(Continued)

FOREIGN PATENT DOCUMENTS

CN       1349615 A     5/2002
CN       1421713 A     6/2003
(Continued)

OTHER PUBLICATIONS

International Search Report dated Mar. 19, 2019 in PCT/JP2019/001344 filed Jan. 17, 2019, 1 page.
(Continued)

*Primary Examiner* — Omar R Rojas
(74) *Attorney, Agent, or Firm* — Oblon, McClelland, Maier & Neustadt, L.L.P.

(57) ABSTRACT

A method for manufacturing an optical fiber preform includes: producing a core preform including a core portion made of transparent glass and a first cladding layer obtained by adding fluorine to the core portion; and forming, on an outer periphery of the first cladding layer, a second cladding layer made of glass having a refractive index higher than that of the first cladding layer. Further, a refractive index profile is formed in the first cladding layer due to a fluorine concentration profile, the refractive index profile being provided at least near a boundary surface with the second cladding layer and having a profile such that a refractive index difference between a refractive index of the first cladding layer and a refractive index of the second cladding
(Continued)

layer decreases in accordance with a reduction in a distance from the boundary surface with the second cladding layer.

14 Claims, 5 Drawing Sheets

(51) Int. Cl.
    *C03B 37/014*     (2006.01)
    *C03C 25/104*     (2018.01)
    *G02B 6/12*     (2006.01)

(52) U.S. Cl.
    CPC .... *G02B 6/03622* (2013.01); *C03B 37/01453* (2013.01); *C03B 2203/22* (2013.01); *G02B 2006/12166* (2013.01)

(56) References Cited

U.S. PATENT DOCUMENTS

| 6,954,573 | B2 | 10/2005 | Cho et al. |
|---|---|---|---|
| 2014/0161406 | A1* | 6/2014 | Kumano ........... C03B 37/01453 385/128 |

FOREIGN PATENT DOCUMENTS

| CN | 101987778 A | 3/2011 |
|---|---|---|
| CN | 102804007 A | 11/2012 |
| CN | 103842306 A | 6/2014 |
| CN | 105556353 A | 5/2016 |
| JP | 2002-82250 A | 3/2002 |
| JP | 2002-540057 A | 11/2002 |
| JP | 2003-185870 A | 7/2003 |
| JP | 2014-71152 A | 4/2014 |
| WO | WO 2013/021759 A1 | 2/2013 |

OTHER PUBLICATIONS

Chinese office action dated Jan. 24, 2022 in Chinese Application No. 201980008795.1, with English translation of the cover page and English machine translation of the main body thereof, 19 pages.

* cited by examiner

METHOD FOR MANUFACTURING OPTICAL FIBER PREFORM, OPTICAL FIBER PREFORM, METHOD FOR MANUFACTURING OPTICAL FIBER, AND OPTICAL FIBER

CROSS-REFERENCE TO RELATED APPLICATION(S)

This application is a continuation of International Application No. PCT/JP2019/001344, filed on Jan. 17, 2019 which claims the benefit of priority of the prior Japanese Patent Application No. 2018-007172, filed on Jan. 19, 2018, the entire contents of which are incorporated herein by reference.

BACKGROUND

The present disclosure relates to a method for manufacturing an optical fiber preform, an optical fiber preform, a method for manufacturing an optical fiber, and an optical fiber.

An optical fiber including silica-based glass is typically manufactured by stretching an optical fiber preform including silica-based glass. To manufacture the optical fiber preform, for example, a vapor-phase axial deposition (VAD) method is used. In the VAD method, a glass material gas is supplied to a burner, and the glass material gas is subjected to hydrolysis reaction, whereby glass particles are synthesized. Then, while a start rod is rotated and pulled up, the glass particles are deposited on the start rod, and the porous body including the glass particles is caused to grow in the lower portion of the start rod; thus, a porous glass preform is produced. The porous glass preform is subjected to a sintering step (also referred to as a vitrification step) for transparent vitrification so as to be a core preform. The core preform includes a core portion and part of a cladding portion formed on the outer periphery of the core portion. Then, a porous glass body is formed on the outer periphery of the core preform by using, for example, the OVD (Outer Vapor Deposition) method, and the porous glass body is produced as a transparent glass so that the remaining part of the cladding portion is formed. Thus, a transparent optical fiber preform to be stretched is produced.

There is a known optical fiber including silica-based glass and including: a core portion; a first cladding layer formed on the outer periphery of the core portion and having a refractive index lower than the highest refractive index of the core portion; and a second cladding layer formed on the outer periphery of the first cladding layer and having a refractive index higher than that of the first cladding layer (Japanese National Publication of International Patent Application No. 2002-540057 and Japanese Laid-open Patent Publication No. 2014-071152). The refractive index profile of this type of optical fiber is also referred to as W-shape and may be used to achieve a low transmission loss and a low bending loss of the optical fiber. The first cladding layer is also referred to as a depressed layer. Typically, fluorine, which is a dopant for reducing the refractive index, is added to the first cladding layer. The second cladding layer has a small amount of fluorine added thereto as compared with the first cladding layer or includes pure silica glass that does not contain a dopant for adjusting the refractive index.

SUMMARY

There is a need for providing a method for manufacturing an optical fiber preform, an optical fiber, a method for manufacturing an optical fiber, and an optical fiber which can reduce the loss.

According to an embodiment, a method for manufacturing an optical fiber preform, includes: a first step of producing a core preform including a core portion made of transparent glass and a first cladding layer obtained by adding fluorine to an outer periphery of the core portion; and a second step of forming, on an outer periphery of the first cladding layer, a second cladding layer made of glass having a refractive index higher than a refractive index of the first cladding layer. Further, a first refractive index profile is formed in the first cladding layer due to a fluorine concentration profile, the first refractive index profile being provided at least near a boundary surface with the second cladding layer and having a profile such that a refractive index difference between a refractive index of the first cladding layer and a refractive index of the second cladding layer decreases in accordance with a reduction in a distance from the boundary surface with the second cladding layer.

According to an embodiment, an optical fiber preform includes: a core portion made of glass; a first cladding layer formed on an outer periphery of the core portion and having fluorine added thereto to have a refractive index lower than a highest refractive index in the core portion; and a second cladding layer formed on an outer periphery of the first cladding layer and made of glass having a higher softening point and a higher refractive index as compared with the first cladding layer. Further, the first cladding layer has a first refractive index profile provided at least near a boundary surface with the second cladding layer and having a profile such that a refractive index difference between a refractive index of the first cladding layer and a refractive index of the second cladding layer decreases in accordance with a reduction in a distance from the boundary surface with the second cladding layer.

According to an embodiment, an optical fiber includes:
a core portion made of glass; a first cladding layer formed on an outer periphery of the core portion and having fluorine added thereto to have a refractive index lower than a highest refractive index in the core portion; and a second cladding layer formed on an outer periphery of the first cladding layer and made of glass having a higher softening point and a higher refractive index as compared with the first cladding layer. Further, the first cladding layer has a first refractive index profile provided at least near a boundary surface with the second cladding layer and having a profile such that a refractive index difference between a refractive index of the first cladding layer and a refractive index of the second cladding layer decreases in accordance with a reduction in a distance from the boundary surface with the second cladding layer.

DETAILED DESCRIPTION

In the related art, there is a demand for a further reduction in the transmission loss (hereinafter referred to as reduction in the loss) of the W-shaped optical fiber. According to the present inventors' careful study on a reduction in the loss, a sharp change in the refractive index on the boundary surface between the first cladding layer and the second cladding layer may easily cause structural defects or distortions on the boundary surface. Furthermore, it is found out that the structural defects or distortions may cause an increase in the transmission loss and interfere with a reduction in the loss.

An embodiment of the present disclosure is described below with reference to the accompanied drawings. The present disclosure is not limited to the embodiment. In the description of the drawings, the identical or corresponding components are denoted by the same reference numeral as appropriate. In this description, the cut-off wavelength refers to the cable cut-off wavelength defined by ITU-T (International Telecommunication Union) G.650.1. Furthermore, the terms that are not particularly defined in this description conform to the definitions and the measurement methods in ITU-T G.650.1.

First Embodiment

Figure 1:
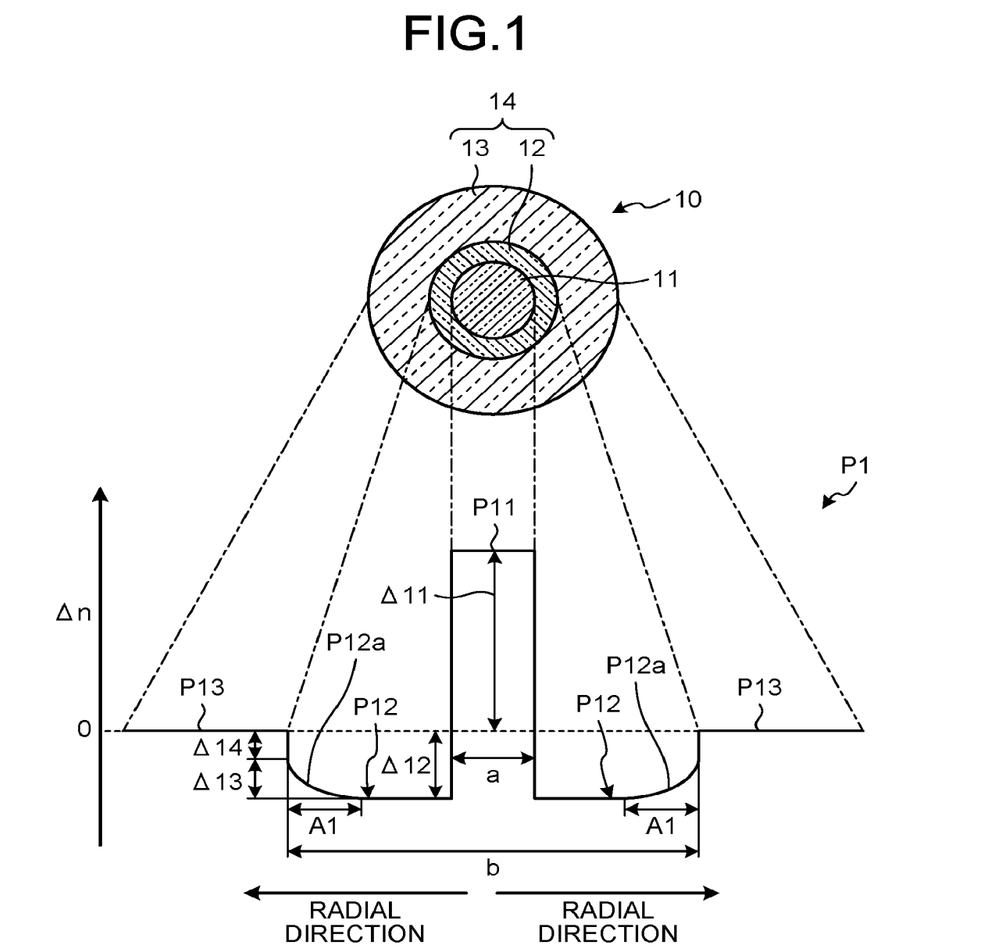
FIG. 1 is a diagram illustrating a schematic cross-section and a refractive index profile of an optical fiber preform according to a first embodiment.

FIG. 1 is a diagram illustrating the schematic cross-section and the refractive index profile of an optical fiber preform according to a first embodiment. As illustrated in FIG. 1, an optical fiber preform 10 includes a core portion 11, a first cladding layer 12 formed on the outer periphery of the core portion 11, and a second cladding layer 13 formed on the outer periphery of the first cladding layer 12. The first cladding layer 12 and the second cladding layer 13 constitute a cladding portion 14.

The core portion 11 includes silica glass to which a dopant, such as germanium, is added to increase the refractive index. The first cladding layer 12 includes silica glass to which fluorine is added so as to have the refractive index lower than the refractive index of the second cladding layer 13. The second cladding layer 13 includes pure silica glass that contains no dopant for adjusting the refractive index. Thus, the second cladding layer 13 has a higher softening point and a higher refractive index as compared with the first cladding layer 12.

The optical fiber preform 10 has a W-shaped refractive index profile P1 illustrated in FIG. 1. Refractive-index profiles P11, P12, and P13 are the refractive index profiles of the core portion 11, the first cladding layer 12, and the second cladding layer 13, respectively.

FIG. 1 illustrates the refractive index profile by using a relative refractive-index difference with the refractive index of the second cladding layer 13 as a reference. For example, the relative refractive-index difference between the highest refractive index of the core portion 11 and the refractive index of the second cladding layer 13 is $\Delta 11$, and the relative refractive-index difference between the lowest refractive index of the first cladding layer 12 and the refractive index of the second cladding layer 13 is $\Delta 12$. The value of $\Delta 11$ is, for example, 0.35% to 0.5%. The value of $\Delta 12$ is, for example, −0.15% to −0.03%. The core portion 11 has a diameter a, and the first cladding layer 12 has an outer diameter b.

The optical fiber preform 10 is stretched to have the outer diameter that is the cladding diameter of an optical fiber so as to be produced as the optical fiber. The refractive index profile P1 of the optical fiber preform 10 is designed to obtain the required characteristics of the optical fiber that is manufactured due to stretching. The required characteristics of the optical fiber are, for example, the characteristics of a standard single-mode optical fiber for optical fiber communications, i.e., the characteristics with a mode field diameter of 8.6 μm to 9.2 μm and a cut-off wavelength of 1260 nm or less.

The refractive index profile P12 of the first cladding layer 12 is substantially constant by a predetermined length from the side of the core portion 11 toward the outer periphery in the radial direction but has a first refractive index profile P12a in a circular region A1 near the boundary surface with the second cladding layer 13. The first refractive index profile P12a has a profile such that the refractive index difference between the refractive index of the first cladding layer 12 and the refractive index of the second cladding layer 13 continuously decreases in accordance with a reduction in the distance from the boundary surface with the second cladding layer 13. Specifically, in the first cladding layer 12, the refractive index in the region A1 increases toward the outer periphery so as to draw a circular curve that protrudes downward. Here, protruding downward refers to protruding toward a lower refractive index. The first cladding layer 12 includes fluorine, and the fluorine concentration has a profile in the radial direction of the optical fiber preform 10 so as to have the refractive index profile P12. Specifically, the fluorine concentration is substantially constant in the region between the boundary with the core portion 11 and the boundary with the region A1 but decreases toward the outer periphery in the region A1.

For example, as illustrated in FIG. 1, the relative refractive-index difference of the first cladding layer 12 in the region A1 increases from $\Delta 12$ by $\Delta 13$, and therefore the refractive index difference between the first cladding layer 12 and the second cladding layer 13 is reduced to $\Delta 14$ represented by using the relative refractive-index difference at the boundary surface.

As described above, in the optical fiber preform 10, the continuous reduction in the refractive index difference in the first cladding layer 12 and near the boundary surface with the second cladding layer 13 prevents sharp changes in the refractive index at and near the boundary surface. The above-described refractive index profile P12 prevents sharp changes in the softening point at and near the boundary surface. Therefore, the generation of stress at and near the boundary surface and the degree of the stress are suppressed during glass melting by heat and the subsequent cooling in the step of manufacturing the optical fiber preform 10 and in the step of manufacturing an optical fiber from the optical fiber preform 10. This prevents structural defects and residual distortions at and near the boundary surface. As a result, structural defects and residual distortions are also prevented in the manufactured optical fiber, and therefore it is possible to achieve a reduction in the loss. Furthermore, the prevention of structural defects suppresses an increase in the loss due to hydrogen even when a hydrogen aging test is performed on the optical fiber to evaluate the hydrogen resistance.

In the first cladding layer 12, it is preferable that the part where the relative refractive-index difference Δ12 with respect to the lowest refractive index and the relative refractive-index difference Δ13 on the boundary surface with the second cladding layer 13 are 0.005% and more so as to prevent sharp changes in the refractive index. It is preferable that they are 0.02% or less in terms of a small difference in the softening temperature within the first cladding layer 12 and a reduction in the occurrence of structural defects. Furthermore, it is preferable that Δ14 is 0.02% or less in terms of a small difference in the softening temperature between the first cladding layer 12 and the second cladding layer 13 and a reduction in the occurrence of structural defects.

In order to achieve a low bending loss using the first cladding layer 12 in a preferable manner, the ratio of the outer diameter b of the first cladding layer 12 to the diameter a of the core portion 11 is preferably 2 to 5.

It is preferable that the first cladding layer 12 has the first refractive index profile P12a in the region A1 having the width that is 20% or more of the diameter of the first cladding layer 12 from the boundary surface with the second cladding layer 13 in the radial direction. That is, it is preferable that the width (the circular width) of the region A1 in the radial direction of the optical fiber preform 10 is 0.2b or more as represented by using the outer diameter b of the first cladding layer 12. This enables further moderate changes in the refractive index in the region A1. Thus, the vicinity of the boundary surface with the second cladding layer 13 is the circular region having the width of 0.2b from the boundary surface with the second cladding layer 13.

Manufacturing Method

Figure 2:
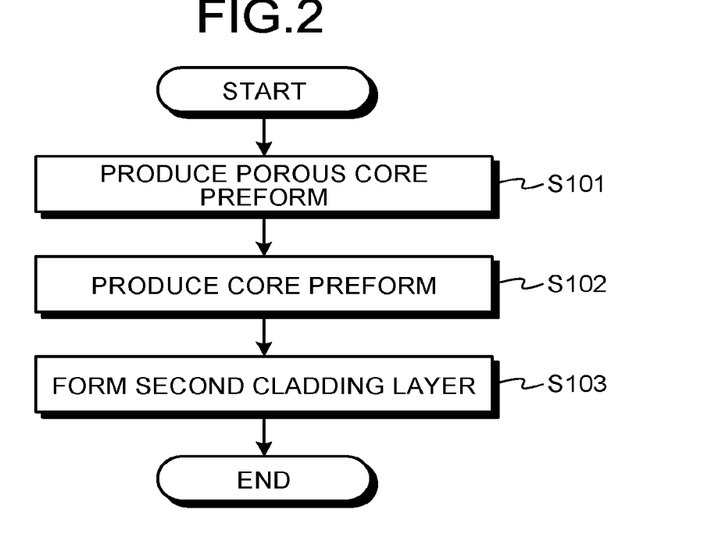
FIG. 2 is a flowchart illustrating an example of a method for manufacturing the optical fiber preform according to the first embodiment.

FIG. 2 is a flowchart illustrating an example of the method for manufacturing the optical fiber preform according to the first embodiment. In this manufacturing method, at Step S101, a porous glass preform is first produced by using the VAD method. Subsequently, at Step S102, a core preform is produced from the porous glass preform. Step S101 and Step S102 constitute a first step. Then, as a second step, a second cladding layer is formed on the outer periphery of the core preform at Step S103.

Figure 3A:
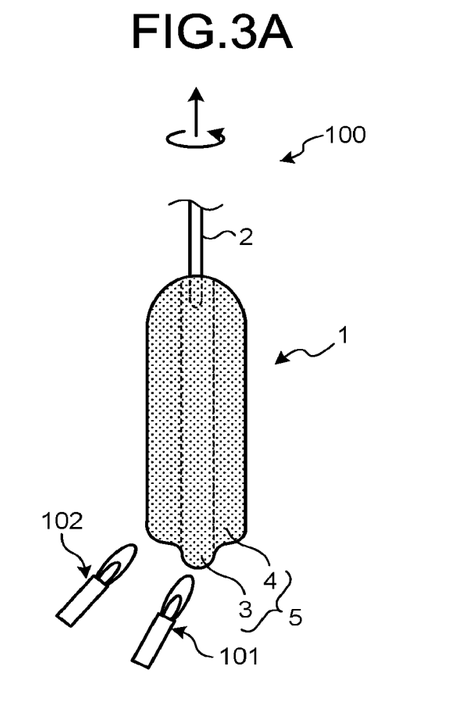
FIG. 3A is a diagram illustrating a step of manufacturing a core preform.

Steps S101 and S102 are first described with reference to FIG. 3A. First, a porous glass preform 1 is produced by using a manufacturing apparatus 100 that implements the VAD method. The manufacturing apparatus 100 includes at least a rotary lifting mechanism (not illustrated), a reaction container (not illustrated), and burners 101 and 102.

The rotary lifting mechanism is configured to rotate a start rod 2 around its central axis as a rotation axis in the reaction container of the manufacturing apparatus 100 and to pull up the start rod 2 in the vertical direction. The start rod 2 is, for example, a high-purity silica glass rod.

The burners 101 and 102 are synthesis burners that synthesize glass particles from a glass material gas and a combustion gas. The burner 101 synthesizes the glass particles forming a porous core portion 3. The porous core portion 3 is a portion that is deposited on the outer periphery of the start rod 2 to be the core portion 11 of the optical fiber preform 10. The burner 101 is supplied with a glass material gas (a gas such as a silicon tetrachloride gas or siloxane and a germanium tetrachloride gas), a flammable gas such as a hydrogen gas and a supporting gas such as an oxygen gas serving as a combustion gas, and a buffer gas that is an inert gas such as an argon gas. The silica glass particles including germanium are synthesized due to the hydrolysis reaction in the flames of the above gases and are blown toward and deposited on the start rod 2 rotated by the rotary lifting mechanism, whereby the porous core portion 3 including silica glass particles containing germanium is formed.

The burner 102 synthesizes the glass particles forming a first porous cladding layer 4. The first porous cladding layer 4 is a portion that is deposited on the outer periphery of the porous core portion 3 to be the first cladding layer 12 of the optical fiber preform 10. The burner 102 is supplied with a glass material gas (a gas such as a silicon tetrachloride gas or siloxane), a combustion gas, a buffer gas, and a gas (e.g., $SF_6$ or $SiF_4$) containing fluorine if necessary. High-purity silica glass particles are synthesized due to the hydrolysis reaction in the flames of the above gases and are blown toward and deposited on the start rod 2, whereby the first porous cladding layer 4 including the silica glass particles is formed.

The porous core portion 3 and the first porous cladding layer 4 constitute a porous body 5. Forming the porous core portion 3 and the first porous cladding layer 4 causes the porous body 5 to grow in the lower portion of the start rod 2. The rotary lifting mechanism pulls up the start rod 2 in accordance with the growing rate of the porous body 5. As described above, while the start rod 2 is rotated and pulled up, the glass particles produced by the burners 101 and 102 are deposited on the start rod 2 so that the porous body 5 is continuously grown in the lower portion of the start rod 2. This makes it possible to produce the porous glass preform 1 including the start rod 2 and the porous body 5.

A burner (not illustrated) may be provided at the intermediate position between the burners 101 and 102 to sinter the boundary area between the porous core portion 3 and the first porous cladding layer 4. The burner is supplied with a combustion gas to jet flames to substantially the boundary area between the porous core portion 3 and the first porous cladding layer 4.

Figure 3B:
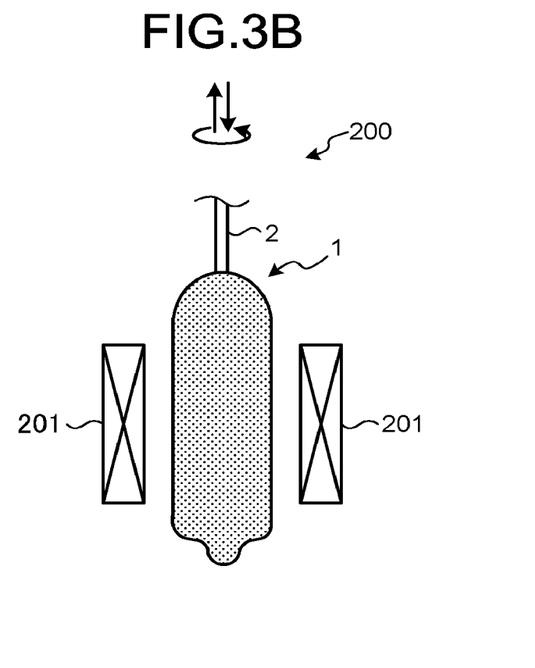
FIG. 3B is a diagram illustrating a step of manufacturing the core preform.

Subsequently, as illustrated in FIG. 3B, a core preform is produced by using a heating furnace 200. The heating furnace 200 includes at least a rotary elevating mechanism (not illustrated), a furnace body (not illustrated), and a heater 201.

The rotary elevating mechanism is configured to rotate the porous glass preform 1 around the central axis of the start rod 2 as a rotation axis in the heating furnace 200 and to elevate the porous glass preform 1 in the vertical direction.

The one or more heaters 201 are disposed in the heating furnace 200 so as to surround the porous glass preform 1. The heating furnace 200 is configured to introduce various processing gases into the furnace body to perform various types of processing on the porous glass preform 1.

The porous glass preform 1 is placed in the heating furnace 200, a predetermined quantity of flow of an inert gas and a dehydration gas such as a chlorine gas are introduced, and the porous glass preform 1 is heated by the heater 201 at a predetermined temperature for a predetermined period of time while the porous glass preform 1 is rotated and elevated, whereby a dehydration process is performed on the porous glass preform 1.

Subsequently, a predetermined quantity of flow of fluorine gas is introduced into the heating furnace 200, and the porous glass preform 1 is heated by the heater 201 at a predetermined temperature for a predetermined period of time while the porous glass preform 1 is rotated and elevated so that fluorine is added to the first porous cladding layer 4 that is the outer peripheral region of the porous glass preform 1. Here, fluorine is added to the first porous cladding layer 4 at substantially a uniform concentration in the radial direction.

Subsequently, a predetermined quantity of flow of inert gas is introduced into the heating furnace 200, and the porous glass preform 1 is heated by the heater 201 at a predetermined temperature for a predetermined period of time while the porous glass preform 1 is rotated and elevated so that the porous glass preform 1 is produced as a transparent glass. This allows the porous core portion 3 to be the core portion 11 of the optical fiber preform 10 and allows the first porous cladding layer 4 to be the first cladding layer 12, and thus the core preform is produced. Fluorine has been added to the first cladding layer 12 to have the refractive index lower than the refractive index of the second cladding layer 13 serving as a reference.

Figure 4:
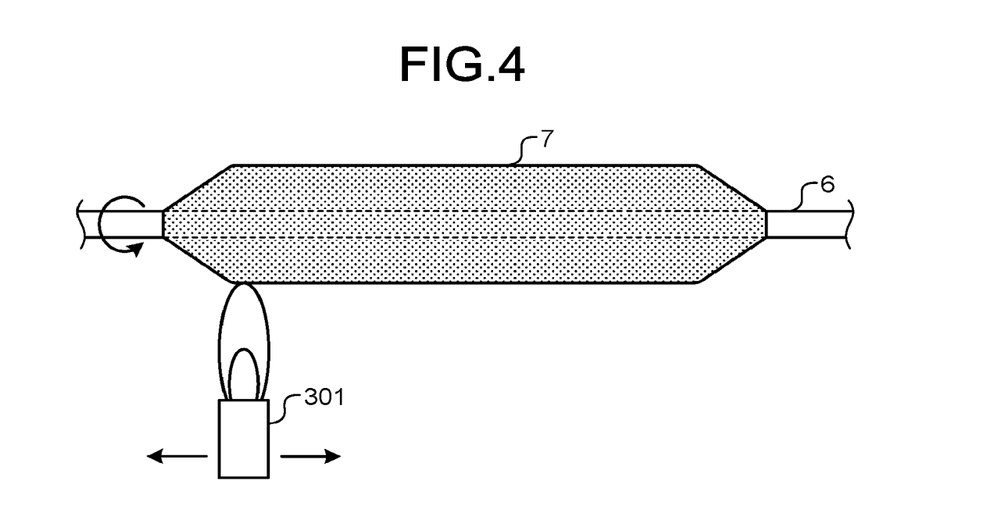
FIG. 4 is a diagram illustrating an OVD method.

Next, Step S103 is described with reference to FIG. 4. In this manufacturing method, the second cladding layer is formed on the outer periphery of the core preform by using a manufacturing apparatus 300 that implements the OVD method. The manufacturing apparatus 300 includes at least a rotary mechanism (not illustrated), a reaction container (not illustrated), and a burner 301.

The rotary mechanism is configured to rotate a core preform 6 around its central axis as a rotation axis in the reaction container of the manufacturing apparatus 300.

The burner 301 is a synthesis burner that synthesizes glass particles from a glass material gas and a combustion gas and synthesizes glass particles forming a second porous cladding layer 7. The second porous cladding layer 7 is a portion that is deposited on the outer periphery of the core preform 6 to be the second cladding layer 13 of the optical fiber preform 10. The burner 301 is supplied with a glass material gas, a combustion gas, and a buffer gas. Due to the hydrolysis reaction in flames of the above gases, high-purity silica glass particles are synthesized. While the burner 301 is relatively moved back and forth along the longitudinal direction of the core preform 6, the silica glass particles are blown toward and deposited on the core preform 6 so that the second porous cladding layer 7 is formed (a third step).

Then, the core preform having the second porous cladding layer 7 formed therein is placed in the heating furnace having the configuration similar to that of the heating furnace 200 illustrated in FIG. 3B, and the dehydration process and the transparent vitrification (a fourth step) are performed on the second porous cladding layer 7 so that the second cladding layer 13 of the optical fiber preform 10 is obtained. Thus, the optical fiber preform 10 is produced.

No fluorine gas is introduced during the transparent vitrification of the first porous cladding layer 4 and the second porous cladding layer 7, or a small quantity of flow of fluorine gas is introduced as compared with the quantity of flow to add fluorine to the first porous cladding layer 4 so that part of the fluorine added to the outer peripheral side of the first porous cladding layer 4 is desorbed, whereby the first refractive index profile P12a may be formed in the refractive index profile P12 of the first cladding layer 12. That is, in the first porous cladding layer 4 and the second porous cladding layer 7, the first refractive index profile P12a is formed depending on the fluorine concentration profile.

In this manufacturing method, the first refractive index profile P12a is formed in accordance with the setting of the heating condition for the transparent vitrification of the first porous cladding layer 4 and the second porous cladding layer 7; however, the first refractive index profile P12a may be formed in accordance with the setting of the heating condition for the transparent vitrification of at least one of the first porous cladding layer 4 and the second porous cladding layer 7.

In this manufacturing method, the OVD method is used to form the second cladding layer 13 of the optical fiber preform 10; however, a high-purity silica glass pipe may adhere to and be integrated with the outer periphery of the core preform 6 so that the silica glass pipe is obtained as the second cladding layer 13. In this case, the first refractive index profile P12a may be formed in accordance with the setting of the heating condition for the transparent vitrification of the first porous cladding layer 4.

Other Embodiments

Next, optical fiber preforms according to a second embodiment to a fifth embodiment are described as other embodiments. The optical fiber preforms according to the second embodiment to the fifth embodiment include a core portion, a first cladding layer, and a second cladding layer as is the case with the first embodiment, and the cross-sectional structures are the same as that in the first embodiment; however, the refractive index profiles are different from that in the first embodiment. Therefore, with regard to the optical fiber preforms according to the second embodiment to the fifth embodiment, the refractive index profiles are primarily described.

Second Embodiment

Figure 5:
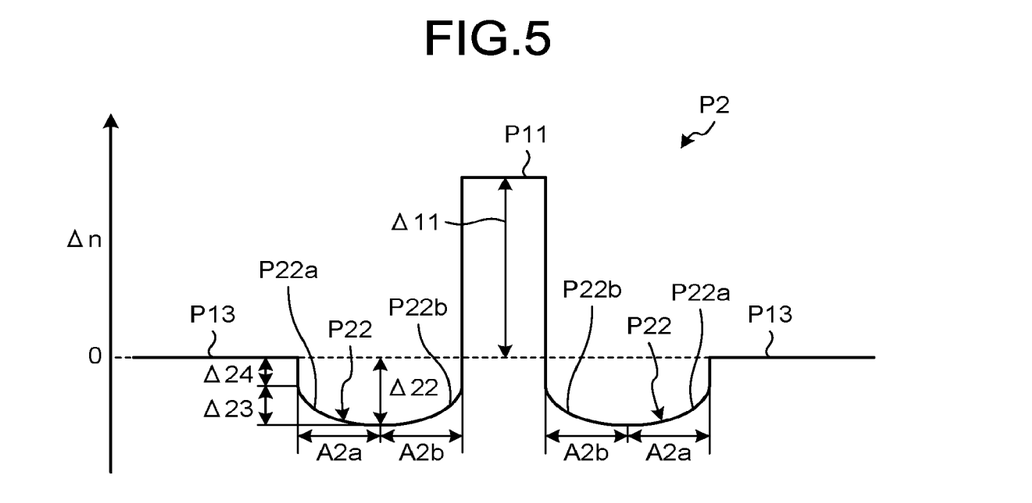
FIG. 5 is a diagram illustrating a refractive index profile of an optical fiber preform according to a second embodiment.

FIG. 5 is a diagram illustrating a refractive index profile P2 of an optical fiber preform according to the second embodiment by using a relative refractive-index difference. The refractive index profile P2 is designed to achieve the required characteristics of the optical fiber that is manufactured by being stretched. The refractive index profile P11, a refractive index profile P22, and the refractive index profile P13 are refractive index profiles of a core portion, a first cladding layer, and a second cladding layer, respectively. As the refractive index profiles P11 and P13 are the same as the refractive index profiles P11 and P13 of the refractive index profile P1, the refractive index profile P22 of the first cladding layer is described below in detail.

In FIG. 5, the relative refractive-index difference between the lowest refractive index of the first cladding layer and the refractive index of the second cladding layer is $\Delta 22$. The value of $\Delta 22$ is, for example, −0.17% to −0.03%.

The refractive index profile P22 has a first refractive index profile P22a in a circular region A2a near the boundary surface with the second cladding layer. The first refractive index profile P22a has a profile such that the refractive index difference between the refractive index of the first cladding layer and the refractive index of the second cladding layer continuously decreases in accordance with a reduction in the distance from the boundary surface with the second cladding layer. Specifically, in the first cladding layer, the refractive index in the region A2a increases toward the outer periphery so as to draw a circular curve that protrudes downward. The refractive index profile P22 further has a second refractive index profile P22b in a circular region A2b near the boundary surface with the core portion. The second refractive index profile P22b has a profile such that the refractive index difference between the refractive index of the first cladding layer and the refractive index of the core portion continuously decreases in accordance with a reduction in the distance from the boundary surface with the core portion. Specifically, in the first cladding layer, the refractive index in the region A2b increases toward the inner periphery so as to draw a circular curve that protrudes downward. According to the second embodiment, the region A2a and the region A2*b* are substantially continuous, and the refractive index profile P22 has a circular curve protruding downward due to the first refractive index profile P22*a* and the second refractive index profile P22*b*. The first cladding layer has the fluorine concentration profile in the radial direction of the optical fiber preform so as to have the first refractive index profile P22*a* in the region A2*a*. Furthermore, the first cladding layer has the fluorine concentration profile and the germanium concentration profile in the radial direction of the optical fiber preform so as to have the second refractive index profile P22*b* in the region A2*b*. The germanium is diffused from the core portion due to a heating process during the manufacturing.

For example, as illustrated in FIG. 5, the relative refractive-index difference of the first cladding layer in the region A2*a* increases from Δ22 by Δ23, and the refractive index difference between the first cladding layer and the second cladding layer is reduced to Δ24 represented by using the relative refractive-index difference at the boundary surface. Δ23 is preferably 0.005% or more and 0.02% or less. Δ24 is preferably 0.02% or less.

In the optical fiber preform according to the second embodiment, as is the case with the optical fiber preform according to the first embodiment, the refractive index difference continuously decreases in the first cladding layer and near the boundary surface with the second cladding layer, and therefore structural defects and residual distortions at and near the boundary surface are suppressed. As a result, it is possible to achieve a reduction in the loss of the manufactured optical fiber. Furthermore, an increase in the loss due to hydrogen is suppressed even when a hydrogen aging test is performed on the manufactured optical fiber.

As the optical fiber preform according to the second embodiment includes the second refractive index profile P22*b* in the region A2*b*, the refractive index difference continuously decreases in the first cladding layer and near the boundary surface with the core portion, which is preferable in terms of suppression of structural defects and residual distortions at and near the boundary surface.

The width of the region A2*a* having the first refractive index profile P22*a* in the radial direction of the optical fiber preform is preferably 0.2b or more when represented by using the outer diameter b of the first cladding layer.

The optical fiber preform according to the second embodiment may be manufactured by using the same manufacturing method as that for the optical fiber preform 10 according to the first embodiment. The second refractive index profile P22*b* in the region A2*b* may have a desired profile by appropriately setting the soot density (the density of a porous body) during the synthesis (the VAD step) of a porous glass preform, the temperature during a vitrification step of the core preform, the stretching velocity and the like.

Third Embodiment

Figure 6:
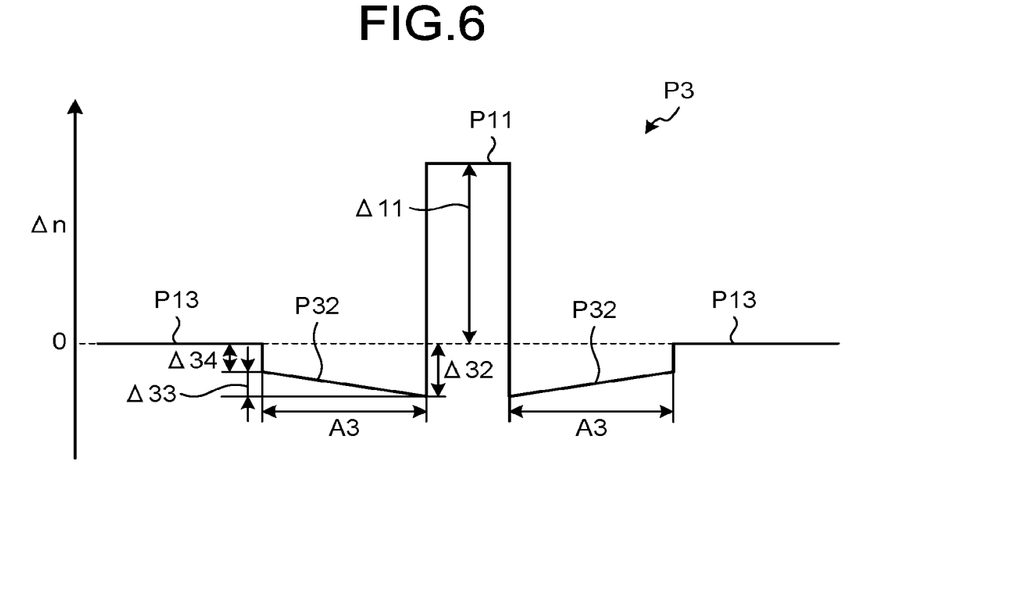
FIG. 6 is a diagram illustrating a refractive index profile of an optical fiber preform according to a third embodiment.

FIG. 6 is a diagram illustrating a refractive index profile P3 of an optical fiber preform according to a third embodiment by using a relative refractive-index difference. The refractive index profile P11, a refractive index profile P32, and the refractive index profile P13 are refractive index profiles of a core portion, a first cladding layer, and a second cladding layer, respectively. The refractive index profile P3 is designed to achieve the required characteristics of the optical fiber that is manufactured by being stretched. As the refractive index profiles P11 and P13 are the same as the refractive index profiles P11 and P13 of the refractive index profile P1, the refractive index profile P32 of the first cladding layer is described below in detail.

In FIG. 6, the relative refractive-index difference between the lowest refractive index of the first cladding layer and the refractive index of the second cladding layer is Δ32. The value of Δ32 is, for example, −0.17% to −0.03%.

The refractive index profile P32 has a first refractive index profile in an entire region A3 between the core portion and the second cladding layer. The first refractive index profile has a profile such that the refractive index difference between the refractive index of the first cladding layer and the refractive index of the second cladding layer continuously decreases in accordance with a reduction in the distance from the boundary surface with the second cladding layer. Specifically, in the first cladding layer, the refractive index in the region A3 linearly increases toward the outer periphery. The first cladding layer has the fluorine concentration profile in the radial direction of the optical fiber preform so that the refractive index profile P32 in the region A3 has the above-described first refractive index profile.

For example, as illustrated in FIG. 6, the relative refractive-index difference of the first cladding layer in the region A3 increases from Δ32 by Δ33, and the refractive index difference between the first cladding layer and the second cladding layer is reduced to Δ34 represented by using the relative refractive-index difference at the boundary surface. Δ33 is preferably 0.005% or more and 0.02% or less. Δ34 is preferably 0.02% or less.

In the optical fiber preform according to the third embodiment, as is the case with the optical fiber preform according to the first embodiment, the refractive index difference continuously decreases in the first cladding layer and near the boundary surface with the second cladding layer, and therefore structural defects and residual distortions at and near the boundary surface are suppressed. As a result, it is possible to achieve a reduction in the loss of the manufactured optical fiber. Furthermore, an increase in the loss due to hydrogen is suppressed even when a hydrogen aging test is performed on the manufactured optical fiber.

The optical fiber preform according to the third embodiment may be manufactured by using the same manufacturing method as that for the optical fiber preform 10 according to the first embodiment. It is preferable to appropriately set the soot density during the synthesis (the VAD step) of a porous glass preform, the quantity of flow of fluorine gas when fluorine is added to the first porous cladding layer, the temperature during a vitrification step of the core preform, the stretching velocity and the like.

Fourth Embodiment

Figure 7:
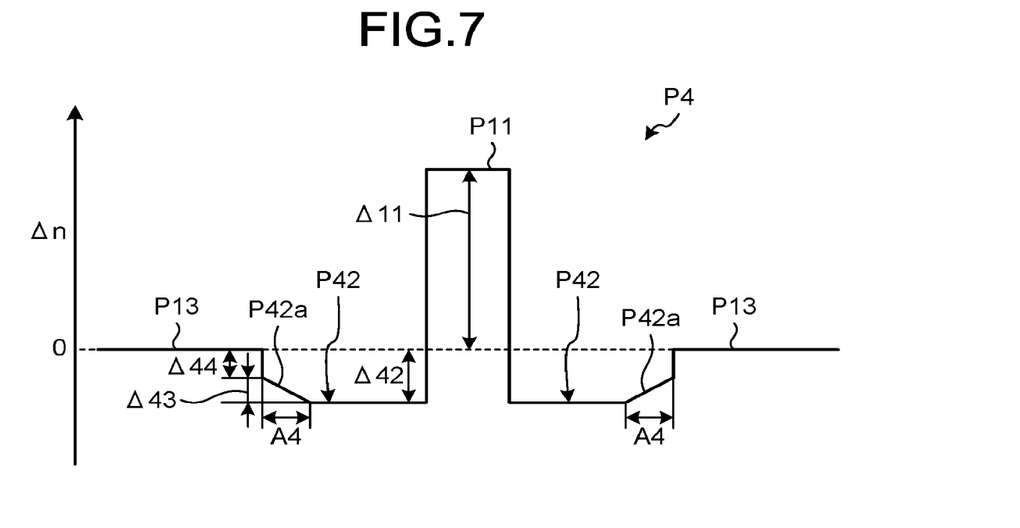
FIG. 7 is a diagram illustrating a refractive index profile of an optical fiber preform according to a fourth embodiment.

FIG. 7 is a diagram illustrating a refractive index profile P4 of an optical fiber preform according to a fourth embodiment by using a relative refractive-index difference. The refractive index profile P11, a refractive index profile P42, and the refractive index profile P13 are refractive index profiles of a core portion, a first cladding layer, and a second cladding layer, respectively. The refractive index profile P4 is designed to achieve the required characteristics of the optical fiber that is manufactured by being stretched. As the refractive index profiles P11 and P13 are the same as the refractive index profiles P11 and P13 of the refractive index profile P1, the refractive index profile P42 of the first cladding layer is described below in detail.

In FIG. 7, the relative refractive-index difference between the lowest refractive index of the first cladding layer and the refractive index of the second cladding layer is Δ42. The value of Δ42 is, for example, −0.15% to −0.03%.

The refractive index profile P42 is substantially constant from the core portion side toward the outer periphery in the radial direction but has a first refractive index profile P42a in a circular region A4 near the boundary surface with the second cladding layer. The first refractive index profile P42a has a profile such that the refractive index difference between the refractive index of the first cladding layer and the refractive index of the second cladding layer continuously decreases in accordance with a reduction in the distance from the boundary surface with the second cladding layer. Specifically, in the first cladding layer, the refractive index in the region A4 linearly increases toward the outer periphery. The first cladding layer has the fluorine concentration profile in the radial direction of the optical fiber preform so as to have the refractive index profile P42 in the region A4.

For example, as illustrated in FIG. 7, the relative refractive-index difference of the first cladding layer in the region A4 increases from Δ42 by Δ43, and therefore the refractive index difference between the first cladding layer and the second cladding layer is reduced to Δ44 represented by using the relative refractive-index difference at the boundary surface. Δ43 is preferably 0.005% or more and 0.02% or less. Δ44 is preferably 0.02% or less.

In the optical fiber preform according to the fourth embodiment, as is the case with the optical fiber preform according to the first embodiment, the refractive index difference continuously decreases in the first cladding layer and near the boundary surface with the second cladding layer, and therefore structural defects and residual distortions at and near the boundary surface are suppressed. As a result, it is possible to achieve a reduction in the loss of the manufactured optical fiber. Furthermore, an increase in the loss due to hydrogen is suppressed even when a hydrogen aging test is performed on the manufactured optical fiber.

The width of the region A4 having the first refractive index profile P42a in the radial direction of the optical fiber preform is preferably 0.2b or more when represented by using the outer diameter b of the first cladding layer.

The optical fiber preform according to the fourth embodiment may be manufactured by using the same manufacturing method as that for the optical fiber preform 10 according to the first embodiment. It is preferable to appropriately set the soot density during the synthesis (the VAD step) of a porous glass preform, the quantity of flow of fluorine gas when fluorine is added to the first porous cladding layer, the temperature during a vitrification step of the core preform, the stretching velocity and the like.

Fifth Embodiment

Figure 8:
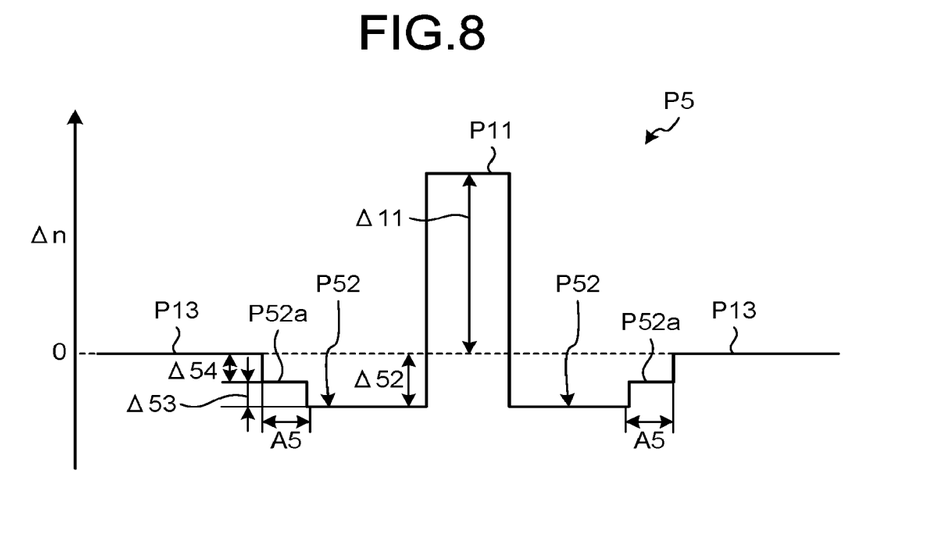
FIG. 8 is a diagram illustrating a refractive index profile of an optical fiber preform according to a fifth embodiment.

FIG. 8 is a diagram illustrating a refractive index profile P5 of an optical fiber preform according to a fifth embodiment by using a relative refractive-index difference. The refractive index profile P5 is designed to achieve the required characteristics of the optical fiber that is manufactured by being stretched. The refractive index profile P11, a refractive index profile P52, and the refractive index profile P13 are refractive index profiles of a core portion, a first cladding layer, and a second cladding layer, respectively. As the refractive index profiles P11 and P13 are the same as the refractive index profiles P11 and P13 of the refractive index profile P1, the refractive index profile P52 of the first cladding layer is described below in detail.

In FIG. 8, the relative refractive-index difference between the lowest refractive index of the first cladding layer and the refractive index of the second cladding layer is Δ52. The value of Δ52 is, for example, −0.15% to −0.03%.

The refractive index profile P52 is substantially constant from the core portion side toward the outer periphery in the radial direction but has a first refractive index profile P52a in a circular region A5 near the boundary surface with the second cladding layer. The first refractive index profile P52a has a profile such that the refractive index difference between the refractive index of the first cladding layer and the refractive index of the second cladding layer decreases in a step-by-step manner in accordance with a reduction in the distance from the boundary surface with the second cladding layer. Specifically, in the first cladding layer, the refractive index in the region A5 increases step by step toward the outer periphery. The first cladding layer has the fluorine concentration profile in the radial direction of the optical fiber preform so as to have the refractive index profile P52 in the region A5.

For example, as illustrated in FIG. 8, the relative refractive-index difference of the first cladding layer in the region A5 increases from Δ52 by Δ53, and therefore the refractive index difference between the first cladding layer and the second cladding layer is reduced to Δ54 represented by using the relative refractive-index difference at the boundary surface. Δ53 is preferably 0.005% or more and 0.02% or less. Δ54 is preferably 0.02% or less.

In the optical fiber preform according to the fifth embodiment, as is the case with the optical fiber preform according to the first embodiment, the refractive index difference decreases in the first cladding layer and near the boundary surface with the second cladding layer, and therefore structural defects and residual distortions at and near the boundary surface are suppressed. As a result, it is possible to achieve a reduction in the loss of the manufactured optical fiber. Furthermore, an increase in the loss due to hydrogen is suppressed even when a hydrogen aging test is performed on the manufactured optical fiber.

The width of the region A5 having the first refractive index profile P52a in the radial direction of the optical fiber preform is preferably 0.2b or more when represented by using the outer diameter b of the first cladding layer.

The optical fiber preform according to the fifth embodiment may be manufactured as described below. First, when the core preform is manufactured by using the same method as the method for manufacturing the optical fiber preform 10 according to the first embodiment, the region having the relative refractive-index difference Δ52 in the first cladding layer is produced. Subsequently, the outer periphery of the region having the relative refractive-index difference Δ52 is subjected to the formation of a porous glass layer by using the OVD method, and the porous glass layer is subjected to the addition of fluorine and the transparent vitrification, whereby the region A5 is formed in the first cladding layer. Then, the second cladding layer is formed.

The method for forming the region A5 is not limited to the OVD method and may include jacketing a silica tube containing fluorine.

The optical fiber manufactured using the optical fiber preform according to the above-described embodiment has the same characteristics as those of the optical fiber preform. Specifically, the optical fiber includes: a core portion including glass; a first cladding layer formed on the outer periphery of the core portion and having fluorine added thereto to have the refractive index lower than the highest refractive index of the core portion; and a second cladding layer formed on the outer periphery of the first cladding layer and including glass having a higher softening point and a higher refractive index as compared with the first cladding layer. The first cladding layer has a first refractive index profile provided at least near the boundary surface with the second cladding layer and having a profile such that the refractive index difference between the refractive index of the first cladding layer and the refractive index of the second cladding layer decreases in accordance with a reduction in the distance from the boundary surface with the second cladding layer.

In the optical fiber, the refractive index difference between the portion of the first cladding layer with the lowest refractive index and the boundary surface with the second cladding layer may be 0.005% or more.

In the optical fiber, the ratio of the outer diameter of the first cladding layer to the diameter of the core portion may be 2 to 5.

In the optical fiber, the first cladding layer may have the first refractive index profile in the region having the width that is 20% or more of the outer diameter of the first cladding layer from the boundary surface with the second cladding layer in the radial direction.

In the optical fiber, the first cladding layer may have the first refractive index profile in the entire region between the core portion and the first cladding layer.

In the optical fiber, the first cladding layer may have the second refractive index profile provided at least near the boundary surface with the core portion and having a profile such that the refractive index difference between the refractive index of the first cladding layer and the refractive index of the core portion decreases in accordance with a reduction in the distance from the boundary surface with the core portion.

According to the present disclosure, there is an advantage such that it is possible to achieve a reduction in the loss of the optical fiber.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber preform comprising:
   a core portion made of glass;
   a first cladding layer formed on an outer periphery of the core portion and having fluorine added thereto to have a refractive index lower than a highest refractive index in the core portion; and
   a second cladding layer formed on an outer periphery of the first cladding layer and made of glass having a higher softening point and a higher refractive index as compared with the first cladding layer, wherein
   the first cladding layer has a first refractive index profile provided at least near a boundary surface with the second cladding layer and having a profile such that a refractive index difference between a refractive index of the first cladding layer and a refractive index of the second cladding layer decreases in accordance with a reduction in a distance from the boundary surface with the second cladding layer,
   when a relative refractive-index difference between a highest refractive index of the core portion and the refractive index of the second cladding layer is $\Delta 11$, and a relative refractive-index difference between a lowest refractive index of the first cladding layer and the refractive index of the second cladding layer is $\Delta 12$, a value of $\Delta 11$ is 0.35% to 0.5% and a value of $\Delta 12$ is −0.15% to −0.03%, and wherein the first cladding layer has the first refractive index profile in a region having a width that is 20% or more of an outer diameter of the first cladding layer from the boundary surface with the second cladding layer in a radial direction of the first cladding layer, and
   wherein when a relative refractive-index difference between a highest refractive index and a lowest refractive index in the first refractive index profile of the first cladding layer is $\Delta 13$, a value of $\Delta 13$ is 0.005% to 0.02%.

2. The optical fiber preform according to claim 1, wherein a relative refractive-index difference between a portion of the first cladding layer with a lowest refractive index and a boundary surface with the second cladding layer is 0.005% or more.

3. The optical fiber preform according to claim 1, wherein a ratio of an outer diameter of the first cladding layer to a diameter of the core portion is 2 to 5.

4. The optical fiber preform according to claim 1, wherein the first cladding layer has the first refractive index profile in an entire region between the core portion and the second cladding layer.

5. The optical fiber preform according to claim 1, wherein the first cladding layer has a second refractive index profile provided at least near a boundary surface with the core portion and having a profile such that a refractive index difference between a refractive index of the first cladding layer and a refractive index of the core portion decreases in accordance with a reduction in a distance from the boundary surface with the core portion.

6. An optical fiber comprising:
   a core portion made of glass;
   a first cladding layer formed on an outer periphery of the core portion and having fluorine added thereto to have a refractive index lower than a highest refractive index in the core portion; and
   a second cladding layer formed on an outer periphery of the first cladding layer and made of glass having a higher softening point and a higher refractive index as compared with the first cladding layer, wherein
   the first cladding layer has a first refractive index profile provided at least near a boundary surface with the second cladding layer and having a profile such that a refractive index difference between a refractive index of the first cladding layer and a refractive index of the second cladding layer decreases in accordance with a reduction in a distance from the boundary surface with the second cladding layer,
   when a relative refractive-index difference between a highest refractive index of the core portion and the refractive index of the second cladding layer is $\Delta 11$, and a relative refractive-index difference between a lowest refractive index of the first cladding layer and the refractive index of the second cladding layer is $\Delta 12$, a value of $\Delta 11$ is 0.35% to 0.5% and a value of $\Delta 12$ is −0.15% to −0.03%%, and wherein the first cladding layer has the first refractive index profile in a region having a width that is 20% or more of an outer diameter of the first cladding layer from the boundary surface with the second cladding layer in a radial direction of the first cladding layer, and
   wherein when a relative refractive-index difference between a highest refractive index and a lowest refractive index in the first refractive index profile of the first cladding layer is $\Delta 13$, a value of $\Delta 13$ is 0.005% to 0.02%.

7. The optical fiber according to claim 6, wherein a relative refractive-index difference between a portion of the first cladding layer with a lowest refractive index and a boundary surface with the second cladding layer is 0.005% or more.

8. The optical fiber according to claim 6, wherein a ratio of an outer diameter of the first cladding layer to a diameter of the core portion is 2 to 5.

9. The optical fiber according to claim 6, wherein the first cladding layer has the first refractive index profile in an entire region between the core portion and the second cladding layer.

10. The optical fiber according to claim 6, wherein the first cladding layer has a second refractive index profile provided at least near a boundary surface with the core portion and having a profile such that a refractive index difference between a refractive index of the first cladding layer and a refractive index of the core portion decreases in accordance with a reduction in a distance from the boundary surface with the core portion.

11. The optical fiber according to claim 6, wherein a mode field diameter of the optical fiber is 8.6 μm to 9.2 μm and a cut-off wavelength of the optical fiber is 1260 nm or less.

12. The optical fiber according to claim 6, wherein a relative refractive-index difference between a portion of the first cladding layer with a lowest refractive index and a boundary surface with the second cladding layer is 0.02% or less.

13. The optical fiber preform according to claim 1, wherein when a relative refractive-index difference between the highest refractive index in the first refractive index profile and the second cladding layer is $\Delta 14$, a value of $\Delta 14$ is 0.02% or less.

14. The optical fiber according to claim 6, wherein when a relative refractive-index difference between the highest refractive index in the first refractive index profile and the second cladding layer is $\Delta 14$, a value of $\Delta 14$ is 0.02% or less.

* * * * *